United States Patent
Ono

(10) Patent No.: US 7,534,824 B2
(45) Date of Patent: May 19, 2009

(54) POLYMER COMPOSITION AND PROCESS FOR PRODUCING THE SAME

(75) Inventor: Hisao Ono, Chuo-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 11/632,950

(22) PCT Filed: Jul. 20, 2005

(86) PCT No.: PCT/JP2005/013336

§ 371 (c)(1),
(2), (4) Date: Jan. 19, 2007

(87) PCT Pub. No.: WO2006/009183

PCT Pub. Date: Jan. 26, 2006

(65) Prior Publication Data

US 2007/0244232 A1    Oct. 18, 2007

(30) Foreign Application Priority Data

Jul. 22, 2004    (JP) .............................. 2004-214765

(51) Int. Cl.
C08K 5/52    (2006.01)
C08K 3/32    (2006.01)
C08F 136/06    (2006.01)
C08F 4/70    (2006.01)
C07C 39/16    (2006.01)

(52) U.S. Cl. ................. 524/128; 526/169.1; 525/333.2; 524/303; 524/349; 524/414; 524/420; 524/145

(58) Field of Classification Search ................. 524/128, 524/145, 414, 349, 303, 420; 526/169.1; 525/333.2
See application file for complete search history.

(56) References Cited

U.S. PATENT DOCUMENTS

| | | | | |
|---|---|---|---|---|
| 4,742,137 A | * | 5/1988 | Ono et al. | 526/92 |
| 4,751,275 A | * | 6/1988 | Witte et al. | 526/139 |
| 5,548,045 A | * | 8/1996 | Goto et al. | 526/161 |
| 5,756,606 A | * | 5/1998 | Wong | 526/94 |
| 5,879,805 A | * | 3/1999 | Brady et al. | 428/407 |
| 6,284,844 B1 | * | 9/2001 | Wong et al. | 525/333.2 |
| 2001/0023282 A1 | * | 9/2001 | Luo | 526/139 |
| 2002/0032296 A1 | * | 3/2002 | Shinozaki et al. | 526/351 |
| 2004/0067380 A1 | * | 4/2004 | Maeda et al. | 428/500 |

FOREIGN PATENT DOCUMENTS

| | | |
|---|---|---|
| JP | 57 109840 | 7/1982 |
| JP | 4 252243 | 9/1992 |
| JP | 8 59733 | 3/1996 |
| JP | 2000 198886 | 7/2000 |
| JP | 2000198886 A * | 7/2000 |
| JP | 2002 38027 | 2/2002 |
| WO | 90 08173 | 7/1990 |

* cited by examiner

Primary Examiner—Mark Eashoo
Assistant Examiner—Michael Pepitone
(74) Attorney, Agent, or Firm—Oblon, Spivak, McClelland, Maier & Neustadt, P.C.

(57) ABSTRACT

A polymer composition which comprises a polymer, a phosphorus compound (a), and a phenol compound (b). The phosphorus compound (a) is, e.g., at least one member selected from compounds represented by the following formula (1). The phenol compound (b) is, e.g., at least one member selected from compounds represented by the following general formula (4),

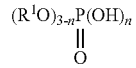

wherein in the general formula (1), the $R^1$ represents $C_{1-20}$ alkyl, allyl, cycloalkyl, phenyl, or alkoxyalkyl and n is 1 or 2, provided that when two $R^1$'s are present, then the $R^1$'s may be the same or different,

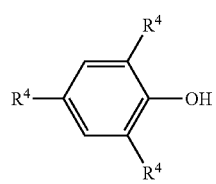

wherein in the general formula (4), the $R^4$'s each independently represents $C_{1-20}$ alkyl, allyl, cycloalkyl, phenyl, alkoxy, or alkylthiomethyl.

12 Claims, No Drawings

POLYMER COMPOSITION AND PROCESS FOR PRODUCING THE SAME

FIELD OF THE INVENTION

The present invention relates to a polymer composition for use, for example, in domestic articles and industrial goods, and to a process for producing the polymer composition.

BACKGROUND OF THE INVENTION

Conventionally, polymer compositions are widely used for domestic articles and industrial goods as plastic or rubber materials. The color tone of these types of polymer compositions is considered to be one of the important quality items of polymer compositions as it may possibly affect the quality of the final products. Factors for deterioration of color tone of polymer compositions include, for example, discoloration caused by heating or heat generation due to shearing stress during the working process of polymer compositions, as well as discoloration due to storage condition of products from polymer composition materials. The polymer composition comprises a phenol compound as a stabilizer in order to improve the problem of color tone. Such a polymer composition is produced, for example, by the method described in Patent Document 1.

Recently, polymerization conditions in the production of polymers has become severe, accompanied by improvement in the productivity of polymers. For example, polymerizing a monomer by a high temperature polymerization enables the productivity for the polymer to improve. Polymers, however, have a tendency to discolor in polymerization under severe conditions; thus there has been a problem that such discoloration could not be effectively inhibited by only a phenol compound.

[Patent Document 1]: Japanese Laid-Open Patent Publication No. 8-59733

SUMMARY OF THE INVENTION

It is an object of the present invention to provide a polymer composition in which discoloration may be effectively inhibited and a process for producing the same.

In order to achieve the above-mentioned object, the present invention includes the following polymer compositions. In one aspect of the present invention, a polymer composition comprising a polymer, a phosphorus compound (a), and a phenol compound (b) is provided. The above phosphorus compound (a) is at least one member selected from the compounds represented by the following general formulae (1) to (3); the above phenol compound (b) is at least one member selected from the compounds represented by the following general formulae (4) to (7),

(1)

wherein in the general formula (1), the $R^1$ represents $C_{1-20}$ alkyl, allyl, cycloalkyl, phenyl, or alkoxyalkyl and n is 1 or 2, provided that when two or more $R^1$'s are present, then the $R^1$'s may be the same or different,

(2)

wherein in the general formula (2), the $R^2$'s each independently represent $C_{1-20}$ alkyl, allyl, cycloalkyl, phenyl, or alkoxyalkyl,

(3)

wherein in the general formula (3), the $R^3$'s each independently represent $C_{1-20}$ alkyl, allyl, cycloalkyl, phenyl, or alkoxyalkyl,

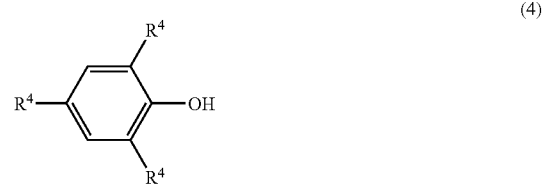
(4)

wherein in the general formula (4), the $R^4$'s each independently represent $C_{1-20}$ alkyl, allyl, cycloalkyl, phenyl, alkoxy, or alkylthiomethyl,

(5)

(6)

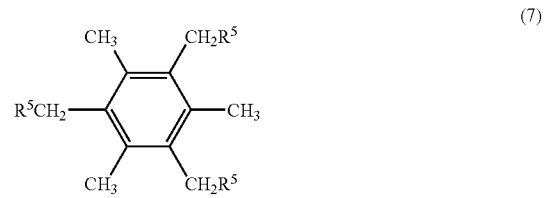
(7)

wherein in the general formulae (5) to (7), the $R^5$'s each represent a substituent shown by the following formula (8); the $R^6$ represents $C_{1-22}$ alkyl.

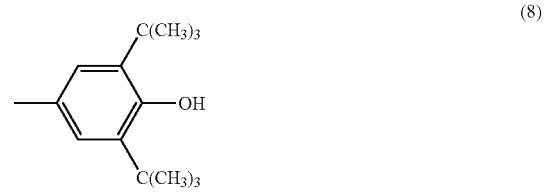
(8)

In another aspect of the present invention, the process for producing the above described polymer composition is provided. This process for production comprises adding a phosphorus compound (a) and a phenol compound (b) to a polymer solution after the termination of solution polymerization, and desolvating the solvent contained in the polymer solution after the adding.

DESCRIPTION OF THE PREFERRED EMBODIMENTS

Below, an embodiment in which the present invention is substantiated will be precisely explained.

The polymer composition in the embodiment of the present invention contains a polymer(s), a phosphorus compound (a) (component (a)), and a phenol compound (b) (component (b)).

The component (a) inhibits the discoloration of polymer compositions by being contained together with the component (b). The component (a) is at least one member selected from the compounds represented by the following general formulae (1) to (3),

wherein in the general formula (1), the $R^1$ represents $C_{1-20}$ alkyl, allyl, cycloalkyl, phenyl, or alkoxyalkyl and n is 1 or 2, provided that when in a case where two or more $R^1$'s are present, then the $R^1$'s may be the same or different,

wherein in the general formula (2), the $R^2$'s each independently represent $C_{1-20}$ alkyl, allyl, cycloalkyl, phenyl, or alkoxyalkyl,

wherein in the general formula (3), the $R^3$'s each independently represent $C_{1-20}$ alkyl, allyl, cycloalkyl, phenyl, or alkoxyalkyl.

The compound represented by the general formula (1) is preferably at least one member of the compounds selected from the group consisting of methyl acid phosphate, ethyl acid phosphate, butyl acid phosphate, butoxyethyl acid phosphate, 2-ethylhexyl acid phosphate, bis(2-ethylhexyl) acid phosphate, oleyl acid phosphate, isodecyl acid phosphate, monoisodecyl acid phosphate, tetracosyl acid phosphate, ethylene glycol acid phosphate, and (2-hydroxylethyl)methacrylate acid phosphate, as they are highly effective in the inhibition of discoloration of polymer compositions. Commercially available products of the compounds represented by the general formula (1) include JP502, JP504, JP504A, JP506H, JP508, JP518, JP524R, EGAP, JPA-514, JPA-514A, DBP, and LB58 produced by Johoku Chemical Co., Ltd., AP-1, AP-4, AP-8, and AP-10 produced by Daihachi Chemical Industry Co., Ltd.

The compounds represented by the general formula (2) include, for example, dimethyl hydrogen phosphite, diethyl hydrogen phosphite, dipropyl hydrogen phosphite, dibutyl hydrogen phosphite, di-2-ethylhexyl hydrogen phosphite, dilauryl hydrogen phosphite, dioleyl hydrogen phosphite, diphenyl hydrogen phosphite, and 9,10-dihydro-9-oxa-10-phosphophenanthrene-10-oxide. Commercially available products of the compounds represented by the general formula (2) include JP-202, JP-212, JP-213D, JP-218-OR, and JP-260 produced by Johoku Chemical Co., Ltd., SANKO™-HCA produced by Sanko Co., Ltd.

The compounds represented by the general formula (3) include, for example, dibutyl phosphate, bis(2-ethylhexyl) phosphate, monobutyl phosphate, and monoisodecyl phosphate. Commercially available products of the compounds represented by the general formula (3) include DBP and LB58 produced by Johoku Chemical Co., Ltd., DP-4, MP-4, DP-8R, MP-10, and PC-88A produced by Daihachi Chemical Industry Co., Ltd.

As the component (a) easily acts synergistically with the component (b) to affect polymers, the component (a) is, preferably, at least one member selected from the compounds represented by the general formulae (1) and (2), more preferably, at least one member selected from the group consisting of ethyl acid phosphate, butyl acid phosphate, 2-ethylhexyl acid phosphate, bis(2-ethylhexyl) acid phosphate, diphenyl hydrogen phosphite, and 9,10-dihydro-9-oxa-10-phosphophenanthrene-10-oxide, and still more preferably, at least one member selected from the group consisting of ethyl acid phosphate, butyl acid phosphate, and 2-ethylhexyl acid phosphate.

The content of the component (a) in the polymer composition is preferably from 0.01 to 2.0 parts by weight, more preferably from 0.02 to 1.8 parts by weight, and still more preferably from 0.03 to 1.6 parts by weight per 100 parts by weight of the polymer. When the content of the component (a) is less than 0.01 parts by weight per 100 parts by weight of the polymer, it is difficult to inhibit the discoloration of the polymer composition sufficiently. When the component (a) is contained in excess of 2.0 parts by weight in the polymer composition, on the other hand, inhibiting effect on the discoloration of polymer composition hardly improves any more.

The component (b) inhibits the discoloration of the polymer composition by being contained together with the component (a). The compound (b) is at least one member selected from the compounds represented by the following general formulae (4) to (7),

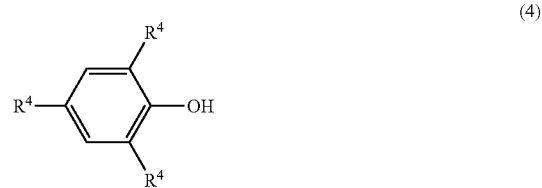

wherein in the general formula (4), the $R^4$'s each independently represent $C_{1-20}$ alkyl, allyl, cycloalkyl, phenyl, alkoxy, or alkylthiomethyl,

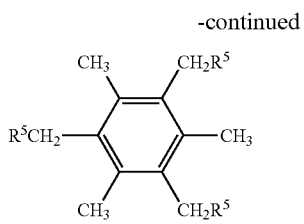

(7)

wherein in the general formulae (5) to (7), the $R^5$'s each represent a substituent shown by the following formula (8); the $R^6$ represents $C_{1-22}$ alkyl.

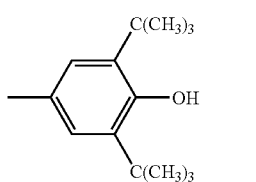

(8)

The compounds represented by the general formula (4) include, for example, 2,2-dihydroxy-3,3-bis(methylcyclohexyl)-5,5-dimethyldiphenylmethane, 2,6-di-tert-butyl-4-methylphenol, 2,6-di-tert-butyl-4-ethylphenol, 2,6-di-tert-butyl-4-n-butylphenol, 2,6-di-tert-butyl-4-i-butylphenol, 2,6-di-tert-butyl-4-i-butylphenol, 2-tert-butyl-4,6-dimethylphenol, 2,4,6-tricyclohexylphenol, 2,6-di-tert-butyl-4-methoxyphenol, 2,6-diphenyl-4-octadecyloxyphenol, 4,6-bis(octylthiomethyl)-o-cresol (CAS No. 110553-27-0, alias: 2,4-bis(octylthiomethyl)-6-methylphenol), 2,4-bis(2',3'-dihydroxypropilthiomethyl)-3,6-di-methylphenol, and 2,4-bis(2'-acetyloxyethylthiomethyl)-3,6-di-methylphenol.
Commercially available products of the compounds represented by the general formula (4) include, for example, Sumilyzer™ BHT, GM, GS, MDP-S, and BBM-S produced by Sumitomo Chemical Co., Ltd., IRGANOX™ 1141, and 1520L produced by Ciba Specialty Chemicals Inc.

Among the compounds represented by the general formula (4), the compound in which at least one of the $R^4$'s is $C_{1-12}$ alkylthiomethyl is preferable, as it can better inhibit the discoloration with age. Particularly, at least one member selected from 4,6-bis(octylthiomethyl)-o-cresol, 2,4-bis(2',3'-di-hydroxypropilthiomethyl)-3,6-di-methylphenol, and 2,4-bis(2'-acetyloxyethylthiomethyl)-3,6-di-methylphenol is preferable; 4,6-bis(octylthiomethyl)-o-cresol is more preferable.

As the compounds represented by the general formula (5), n-octadecyl-3-(3',5'-di-tert-butyl-4-hydroxyphenyl)propionate which has an octadecyl group as $R^6$ is preferable, as it can better inhibit the discoloration with age. Commercially available products of the compounds represented by the general formula (5) include, for example, IRGANOX™ 1076 produced by Ciba Specialty Chemicals Inc.

The compounds represented by the general formula (6) include, for example, tetrakis[methylene-3-(3',5'-di-tert-butyl-4'-hydroxyphenyl)propionate]-methane. Commercially available products of the compounds represented by the general formula (6) include, for example, IRGANOX™ 1010 produced by Ciba Specialty Chemicals Inc.

The compounds represented by the general formula (7) include, for example, 1,3,5-trimethyl-2,4,6-tris(3,5-di-tert-butyl-4-hydroxybenzyl)benzene. Commercially available products of the compounds represented by the general formula (7) include, for example, IRGANOX™ 1330 produced by Ciba Specialty Chemicals Inc.

The content of the component (b) in the polymer composition is preferably 0.01 to 2.0 parts by weight, more preferably 0.02 to 1.8 parts by weight, and still more preferably 0.03 to 1.6 parts by weight per 100 parts by weight of the polymer. When the content of the component (b) is less than 0.01 parts by weight per 100 parts by weight of the polymer, it is difficult to inhibit the discoloration of the polymer composition sufficiently. When the component (b) is contained in excess of 2.0 parts by weight in the polymer composition, on the other hand, inhibiting effect on the discoloration of polymer composition hardly improves any more.

Further, the polymer composition contains preferably a sulfur compound (c) (the component (c)) from the point of view that the compound better inhibits the discoloration of the composition. The component (c) is at least one member selected from the compounds represented by the following general formula (9), $$R^7-S-R^7 \qquad (9)$$

wherein in the general formula (9), the $R^7$'s each independently represent $C_{1-20}$ alkyl, allyl, cycloalkyl, phenyl, or alkoxycarbonylalkyl.

The compounds represented by the general formula (9) are classified as alkylthioethers. The aforementioned compounds include, for example, pentaerythritol-tetrakis(β-lauryl-thio-propionate), dilauryl-3,3'-thiodipropionate, dimyristyl-3,3'-thiodipropionate and distearyl-3,3'-thiodipropionate. Commercially available products of the compounds represented by the general formula (9) include, for example, IRGANOX™ PS800FL, PS802FL, and IRGAFOS™ 168 produced by Ciba Specialty Chemicals Inc.; Sumilyzer™ WX-R, TPL-R, TMP, TPS, and TP-D produced by Sumitomo Chemical Co., Ltd.

The content of the component (c) in the polymer composition is preferably 0.01 to 2.0 parts by weight, more preferably 0.02 to 1.8 parts by weight, and still more preferably 0.03 to 1.6 parts by weight per 100 parts by weight of the polymer. When the content of the component (c) is less than 0.01 parts by weight per 100 parts by weight of the polymer, it is difficult for the component to sufficiently exert its inhibiting effect on the discoloration of the polymer composition. When the component (c) is contained in excess of 2.0 parts by weight in the polymer composition, on the other hand, inhibiting effect on the discoloration of polymer composition hardly improves any more.

The polymer is preferably at least one member selected from the group consisting of conjugated diene polymers, ethylene/α-olefin copolymers, cycloolefin polymers, and their hydrogenated products, from the point of view that the inhibiting effect of each of the aforementioned components on the discoloration of polymer compositions is facilitated in the above polymers.

The conjugated diene polymers comprise homopolymers of a conjugated diene, and copolymers of a conjugated diene with a monomer which is copolymerizable with the conjugated diene. The conjugated dienes include, for example, 1,3-butadiene, 4-alkyl substituted-1,3-butadiene, and 2-alkyl substituted-1,3-butadiene.

The 4-alkyl substituted-1,3-butadienes include, for example, 1,3-pentadiene, 1,3-hexadiene, 1,3-heptadiene, 1,3-octadiene, 1,3-nonadiene, and 1,3-decadiene.

The 2-alkyl substituted-1,3-butadienes include, for example, 2-methyl-1,3-butadiene(isoprene), 2-ethyl-1,3-butadiene, 2-propyl-1,3-butadiene, 2-isopropyl-1,3-butadiene, 2-butyl-1,3-butadiene, 2-isobutyl-1,3-butadiene, 2-amyl-1,3-butadiene, 2-isoamyl-1,3-butadiene, 2-hexyl-1,3-butadiene, 2-cycloexyl-1,3-butadiene, 2-isohexyl-1,3-butadiene, 2-heptyl-1,3-butadiene, 2-isoheptyl-1,3-butadiene, 2-octyl-1,3-butadiene, and 2-isooctyl-1,3-butadiene.

The monomers copolymerizable with a conjugated diene include, for example, styrene, o-methylstyrene, m-methylstyrene, p-methylstyrene, 2,4-dimethylstyrene, o-ethylstyrene, m-ethylstyrene, p-ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-4,6-dichlorostyrene, 2,4-dibromostyrene, and vinylnaphthalene.

The α-olefins in the ethylene/α-olefin copolymers include, for example, propylene, 1-butene, 1-pentene, 1-hexene, 1-octene, and 1-heptene. The cycloolefins in the polymers of a cycloolefin(s) include, for example, cyclopentene, cyclohexene, norbornene, and cyclohexadiene.

The polymer is more preferably a polymer which is polymerized using a catalyst containing a transition metal or an alkali metal, as the inhibiting effect of each of the components (a) and (b) on the discoloration of the polymer compositions is particularly high. The polymers which are polymerized using a catalyst containing a transition metal include, for example, cis-1,4-polybutadiene polymerized using a cobalt catalyst, and syndiotactic 1,2-polybutadiene by solution polymerization using a cobalt-phosphine catalyst. The polymers which are polymerized using a catalyst containing an alkali metal include, for example, a styrene/butadiene block copolymer and a styrene/isoprene block copolymer, anionically polymerized using an alkyl lithium catalyst. Further, the polymers may be obtained also, for example, by using a catalyst, a titanocene compound or a nickel compound containing a transition metal as a hydrogenating catalyst for hydrogenating a styrene/butadiene block copolymer or a styrene/isoprene block copolymer.

The polymers are more preferably cis-1,4-polybutadiene and syndiotactic 1,2-polybutadiene from the viewpoint that the discoloration of the polymer composition caused by cobalt can be effectively inhibited. Further, from the viewpoint of especially effectively inhibiting the discoloration resulting from solution polymerization at a high temperature, it is particularly preferable that the polymer is syndiotactic 1,2-polybutadiene.

The content of 1,2-bond in syndiotactic 1,2-polybutadiene is preferably not less than 70%, more preferably not less than 75%, and most preferably not less than 90%, as the inhibiting effect of syndiotactic 1,2-polybutadiene on the discoloration of the polymer composition is more effectively exerted.

The polymer composition may contain, for example, processing oil and various fillers as other additives.

The polymer composition is produced through adding step and desolvating step. In adding step, the components (a) and (b), as well as the component (c) and the like according to need, are added to a polymer solution containing the polymer and the solvent thereof. The polymer solution is a solution in which the polymerization reaction has been stopped by the addition of a polymerization terminator. In adding step, each component is mixed with the polymer solution by a known method. For this mixing procedure, a roll, a banbury, or an extruder, for example, may be employed. The order of the addition of each component to the polymer solution is not specified, and thus the components (a) to (c) and other additives may be, for example, simultaneously added to the polymer solution.

In desolvating step, the solvent in the polymer solution, to which each of the aforementioned components has been added, is removed to obtain the polymer composition containing the polymer and the each component. To the desolvation procedure, a known method such as a direct removing method, a steam stripping method, and in addition, a method of removing the solvent by heated roll may be applied.

The polymer composition may be utilized in the application in which special importance is placed on the color tone, for example, in toys, footwear, and household sundries, and in addition, as a modifier for plastics.

This polymer composition may be used as a material for various molded articles, for example, after being pelletized. In this case, the polymer composition may provide pellets with good color tone, as the discoloration of the pellets is inhibited by each of the components (a) and (b) being contained in the polymer composition. Further, the discoloration of pellets during storage can be inhibited. The pellets are molded into various molded articles after the combining of pigments or the like according to need. In this case also, the discoloration of pellets due to melting by heat, or shearing stress may be inhibited as the polymer composition contains each of the components (a) and (b).

The effects exerted by the embodiment of the present invention will be described bellow.

In the polymer composition in this embodiment, the discoloration of the polymer composition may be effectively inhibited by the component (a) which is a particular phosphorus compound being contained in addition to the component (b), wherein the component (a) is supposed to act synergistically with the component (b) to affect polymers. Further, this polymer composition may make desired color to stand out in a case where it is used after the coloration, as the polymer composition has a good color tone. As a result, aesthetic properties of domestic articles and industrial products obtained from the polymer composition may be improved. Further, the utility value of the polymer composition is very high, as the polymer composition hardly harms the color tone of plastics when it is used as a resin modifier in the mixture with another resin through the use of the properties of the polymer.

The polymer composition in this embodiment contains, in addition, preferably the component (c). In a case where the polymer composition is composed in this way, the discoloration of the polymer composition may be better inhibited.

In the polymer composition in this embodiment, the polymer is preferably at least one member selected from the group consisting of conjugated diene polymers, ethylene/α-olefin copolymers, cycloolefin polymers, and their hydrogenated products. As the inhibiting effect of each of the components (a) and (b) on the discoloration is easily exerted in these polymers, higher inhibiting effect on discoloration may be obtained. Particularly, syndiotactic 1,2-polybutadiene, which is a conjugated diene polymer, may exert an excellent inhibiting effect on the discoloration.

In the polymer composition in this embodiment, the polymer is preferably a polymer which is polymerized using a catalyst containing a transition metal or an alkali metal. In a case where the polymer composition is composed in this way, the discoloration of the polymer composition due to a trace amount of residual transition metal or alkali metal in it may be inhibited.

The process for producing the polymer composition in this embodiment comprises adding step wherein each of the components (a) and (b) and the like are added to the polymer solution after the termination of solution polymerization, and desolvating step wherein the solvent contained in the polymer solution is removed. In the case of this process for production, the discoloration of the polymer composition may be effectively inhibited as the discoloration of the polymer during a desolvating step may be inhibited.

EXAMPLES

In the next paragraphs, the above-stated embodiment will be more specifically explained by referring to examples and a comparative example. In the following description, "%" is by weight unless otherwise indicated.

<Preparation of a Catalyst Solution>

In a 30 ml pressure bottle, 2.7 ml of 1% cobalt chloride-triphenylphosphine complex solution in methylene chloride, and 12.4 ml of 1% methylaluminoxane (calculated on atomic Al basis) solution in toluene were placed under an atmosphere of dry nitrogen, and then stirred for 10 minutes to obtain a cobalt catalyst solution.

<Synthesis of a Polymer>

In a 500 ml pressure bottle, 60 ml of 1,3-butadiene, 348 ml of cyclohexane and 1.51 ml of the aforementioned cobalt catalyst solution were placed under an atmosphere of dry nitrogen, and then polymerization reaction was carried out under the condition in a thermostat bath at 60° C. and for 60 minutes. After that, the polymer solution containing syndiotactic 1,2-polybutadiene was prepared by stopping the polymerization reaction by further adding 1 ml of isopropanol as a terminator. After the solvent in the polymer solution was removed with an evaporator, 27 g of the polymer was obtained (yield: 75%).

Example 1

With the obtained polymer solution, 0.270 g of 10% 2-ethylhexyl acid phosphate solution in cyclohexane was combined. The amount of combined 2-ethylhexyl acid phosphate as the component (a) corresponds to 0.1 g per 100 g of the polymer. Further, 2,2-dihydroxy-3,3-bis(methylcyclohexyl)-5,5-dimethyldiphenylmethane was combined as the component (b) with a ratio of 0.1 g per 100 g of the polymer, and didodecyl-3,3-thiodipropionate was combined as the component (c) with a ratio of 0.2 g per 100 g of the polymer. After that, the polymer solution was prepared by removing the solvent in the polymer solution with an evaporator.

Examples 2 to 9

In Examples 2 to 9, the polymer compositions were prepared in the same way as Example 1 except that the kind and the combination ratio of each component were altered as shown in Table 1. In Example 8 n-octadecyl-3-(3,5-di-tert-butyl-4-hydroxyphenyl)propionate with a ratio of 0.15 g per 100 g of the polymer, and 4,6-bis(octylthiomethyl)-o-cresol with a ratio of 0.1 g per 100 g of the polymer were combined as the components (b).

Comparative Example 1

The polymer composition was prepared in the same way as Example 1 except that 2-ethylhexyl acid phosphate was not combined.

TABLE 1

|  |  |  | Example | | | | | | | | | | Comparative example |
|---|---|---|---|---|---|---|---|---|---|---|---|---|---|
|  |  |  | 1 | 2 | 3 | 4 | 5 | 6 | 7 | 8 | 9 | 1 |
| Composition | (a) Phosphorus compound | Kind | (a)-1 | (a)-1 | (a)-1 | (a)-2 | (a)-3 | (a)-4 | (a)-4 | (a)-1 | (a)-4 | nil |
|  |  | Loadings (PHR) | 0.1 | 0.05 | 0.03 | 0.1 | 0.1 | 0.05 | 0.05 | 0.05 | 0.05 | 0 |
|  | (b) Phenol compound | Kind | (b)-1 | (b)-1 | (b)-1 | (b)-1 | (b)-1 | (b)-2 | (b)-3 | (b)-3 (b)-4 | (b)-1 | (b)-1 |
|  |  | Loadings (PHR) | 0.1 | 0.1 | 0.1 | 0.1 | 0.1 | 0.3 | 0.1 | 0.15 0.1 | 0.15 | 0.1 |
|  | (c) Sulfur compound | Kind | (c)-1 | (c)-1 | (c)-1 | (c)-1 | (c)-1 | (c)-2 | (c)-3 | (c)-4 | nil | (c)-1 |
|  |  | Loadings (PHR) | 0.2 | 0.2 | 0.2 | 0.2 | 0.2 | 0.2 | 0.1 | 0.2 | 0 | 0.2 |
| Result of evaluation | (I) Color tone immediately after preparation | YI | −5.93 | 0.46 | 0.79 | −5.31 | −5.50 | −2.01 | −1.92 | 0.14 | 0.83 | 4.16 |
|  |  | L | 48.17 | 51.30 | 52.04 | 50.56 | 53.63 | 56.05 | 55.54 | 58.13 | 56.96 | 51.31 |
|  |  | a | −2.10 | −1.24 | −1.15 | −1.58 | −1.42 | −1.11 | −1.19 | −1.24 | −1.17 | −0.81 |
|  |  | b | −0.85 | 0.53 | 0.59 | −0.97 | −1.78 | −0.29 | −0.23 | 0.43 | 0.63 | 1.42 |
|  | (II) Color tone after heat treatment | YI | 47.33 | 44.63 | 50.27 | 46.33 | 47.82 | 36.54 | 52.42 | 10.08 | 50.33 | 65.45 |
|  |  | L | 75.40 | 77.43 | 76.10 | 75.31 | 76.20 | 70.46 | 74.60 | 82.83 | 75.40 | 72.26 |
|  |  | a | −1.70 | −2.61 | −2.21 | −1.81 | −1.63 | −2.01 | −1.66 | −2.22 | −1.70 | −0.74 |
|  |  | b | 21.76 | 20.23 | 25.12 | 20.53 | 21.35 | 15.07 | 26.57 | 5.40 | 21.76 | 26.61 |

In Table 1, the numeric value in the column of "Loadings (PHR)" indicates the loadings (g) per 100 g of the polymer. In the column of "Kind" in the Table 1, (a)-1 denotes 2-ethylhexyl acid phosphate,
(a)-2 denotes ethyl acid phosphate,
(a)-3 denotes butyl acid phosphate,
(a)-4 denotes 2-ethylhexyl acid phosphate,
(b)-1 denotes 2,2-dihydroxy-3,3-bis(methylcyclohexyl)-5,5-dimethyldiphenylmethane,
(b)-2 denotes pentaerythritoltetrakis[3-(3,5-di-tert-butyl-4-hydroxy-phenyl)propionate],
(b)-3 denotes n-octadecyl-3-(3,5-di-tert-butyl-4-hydroxyphenyl)propionate,
(b)-4 denotes 4,6-bis(octylthiomethyl)-o-cresol,
(c)-1 denotes didodecyl-3,3-thiodipropionate,
(c)-2 denotes pentaerythritol-tetrakis(β-lauryl-thiopropionate),
(c)-3 denotes distearyl-3,3'-thiodipropionate, and
(c)-4 denotes dilauryl-3,3-thiodipropionate.

<(I) Color Tone Immediately After Preparation>

The polymer composition immediately after preparation in each example was pressed with a pressing machine to be formed into a sheet (length and breadth: 150 mm, thickness: 2 mm). Next, a 5 mm square was cut out from the sheet of each example with scissors, and then placed in a cell with a diameter of 50 mm. After that, YI (yellow index) value, value L, value a and value b of the sheet were measured in conformity with JIS K 7105-1981 (Test method for the optical properties of plastics) by a reflection method using a SM color computer (Model: SM-3, made by SUGA TEST INSTRUMENTS Co., Ltd.). These results are shown together in Table 1.

<(II) Color Tone After Heat Treatment>

The polymer composition in each example was pressed with a pressing machine to be formed into a sheet (diameter: 50 mm, thickness: 2 mm). Next, sheets of each example were allowed to stand under an atmosphere of air at 170° C. in a gear oven for 6 hours. After that, each sheet was taken out from the gear oven, and allowed to stand at room temperature (25° C.) for an hour. Then, value YI, value L, value a and value b of the sheet were measured in conformity with JIS K 7105-1981 (Test method for the optical properties of plastics) by a reflection method using a SM color computer (Model: SM-3, made by SUGA TEST INSTRUMENTS CO., LTD.). These results are shown together in Table 1.

As evidenced by the results in Table 1, which show that value YI of each example immediately after the preparation indicates a lower value than that of Comparative example 1 immediately after the preparation, it is understood that the discoloration of the polymer compositions of each example during the preparation was inhibited, thereby the polymer compositions demonstrating an excellent color tone. The values YI of Examples 1 to 8 immediately after the preparation indicate lower values than that of Example 9 immediately after the preparation. This fact shows that incorporating the component (c) into the polymer composition enables improving the inhibition of the discoloration of the polymer composition.

Further, the value YI of each example after heat treatment indicates a lower value than that of Comparative example 1 after heat treatment. This fact shows that the discoloration during forming step also may be inhibited in the polymer composition of each example. The value YI of Example 8 after heat treatment indicates a lower value than those of the other examples after heat treatment. This fact shows that incorporating 4,6-bis(octylthiomethyl)-o-cresol as the component (b) into the polymer composition enables improving the inhibition of the discoloration of the polymer composition.

The invention claimed is:

1. A polymer composition comprising:
syndiotactic 1,2-polybutadiene;
2-ethylhexyl acid phosphate;
2,2'-dihydroxy-3,3'-bis(methylcyclohexyl)-5,5'-dimethyldiphenylmethane; and
didodecyl-3,3'-thiodipropionate,
wherein the content of 2-ethylhexyl acid phosphate is 0.03-0.1 wt. % based on 100 wt. % of syndiotactic 1,2-polybutadiene,
wherein the content of 2,2'-dihydroxy-3,3'-bis(methylcyclohexyl)-5,5'-dimethyldiphenylmethane is 0.1 wt. % based on 100 wt. % of syndiotactic 1,2-polybutadiene, and
wherein the content of didodecyl-3,3'-thiodipropionate is 0.2 wt. % based on 100 wt. % of syndiotactic 1,2-polybutadiene.

2. A polymer composition comprising:
syndiotactic 1,2-polybutadiene;
2-ethylhexyl acid phosphate;
pentaerythritoltetrakis[3-(3,5-di-tert-butyl-4-hydroxyphenyl)propionate]; and
pentaerythritoltetrakis(β-laurylthiopropionate),
wherein the content of 2-ethylhexyl acid phosphate is 0.05 wt. % based on 100 wt. % of syndiotactic 1,2-polybutadiene,
wherein the content of pentaerythritoltetrakis[3-(3,5-di-tert-butyl-4-hydroxyphenyl)propionate] is 0.3 wt. % based on 100 wt. % of syndiotactic 1,2-polybutadiene, and
wherein the content of pentaerythritoltetrakis(βlaurylthiopropionate) is 0.2 wt. % based on 100 wt. % of syndiotactic 1,2-polybutadiene.

3. A polymer composition comprising:
syndiotactic 1,2-polybutadiene;
2-ethylhexyl acid phosphate;
n-octadecyl-3-(3,5-di-tert-butyl-4-hydroxyphenyl)propionate; and
distearyl-3,3'-thiodipropionate,
wherein the content of 2-ethylhexyl acid phosphate is 0.05 wt. % based on 100 wt. % of syndiotactic 1,2-polybutadiene,
wherein the content of n-octadecyl-3-(3,5-di-tert-butyl-4-hydroxyphenyl)propionate is 0.1 wt. % based on 100 wt. % of syndiotactic 1,2-polybutadiene, and
wherein the content of distearyl-3,3'-thiodipropionate is 0.1 wt. % based on 100 wt. % of syndiotactic 1,2-polybutadiene.

4. A polymer composition comprising:
syndiotactic 1,2-polybutadiene;
2-ethylhexyl acid phosphate;
n-octadecyl-3-(3,5-di-tert-butyl-4-hydroxyphenyl)propionate;
4,6-bis(octylthiomethyl)-o-cresol; and
dilauryl-3,3'-thiodipropionate,
wherein the content of 2-ethylhexyl acid phosphate is 0.05 wt. % based on 100 wt. % of syndiotactic 1,2-polybutadiene,
wherein the content of n-octadecyl-3-(3,5-di-tert-butyl-4-hydroxyphenyl)propionate is 0.15 wt. % based on 100 wt. % of syndiotactic 1,2-polybutadiene,
wherein the content of 4,6-bis(octylthiomethyl)-o-cresol is 0.1 wt. % based on 100 wt. % of syndiotactic 1,2-polybutadiene, and wherein the content of dilauryl-3,3'-thiodipropionate is 0.2 wt. % based on 100 wt. % of syndiotactic 1,2-polybutadiene.

5. A polymer composition comprising:
syndiotactic 1,2-polybutadiene;
2-ethylhexyl acid phosphate;
2,2'-dihydroxy-3,3'-bis(methylcyclohexyl)-5,5'-dimethyldiphenylmethane; and
didodecyl-3,3'-thiodipropionate,
wherein the content of 2-ethylhexyl acid phosphate is 0.01-2.0 wt. % based on 100 wt. % of syndiotactic 1,2-polybutadiene,
wherein the content of 2,2'-dihydroxy-3,3'-bis(methylcyclohexyl)-5,5'-dimethyldiphenylmethane is 0.01-2.0 wt. % based on 100 wt. % of syndiotactic 1,2-polybutadiene, and
wherein the content of didodecyl-3,3'-thiodipropionate is 0.01-2.0 wt. % based on 100 wt. % of syndiotactic 1,2-polybutadiene.

6. The polymer composition according to claim 5,
wherein the content of 2-ethylhexyl acid phosphate is 0.03-1.6 wt. % based on 100 wt. % of syndiotactic 1,2-polybutadiene,
wherein the content of 2,2'-dihydroxy-3,3'-bis(methylcyclohexyl)-5,5'-dimethyldiphenylmethane is 0.03-1.6 wt. % based on 100 wt. % of syndiotactic 1,2-polybutadiene, and
wherein the content of didodecyl-3,3'-thiodipropionate is 0.03-1.6 wt. % based on 100 wt. % of syndiotactic 1,2-polybutadiene.

7. A polymer composition comprising:
syndiotactic 1,2-polybutadiene;
2-ethylhexyl acid phosphate;
pentaerythritoltetrakis[3-(3,5-di-tert-butyl-4-hydroxyphenyl)propionate]; and
pentaerythritoltetrakis(β-laurylthiopropionate),
wherein the content of 2-ethylhexyl acid phosphate is 0.01-2.0 wt. % based on 100 wt. % of syndiotactic 1,2-polybutadiene,
wherein the content of pentaerythritoltetrakis[3-(3,5-di-tert-butyl-4-hydroxyphenyl)propionate] is 0.01-2.0 wt. % based on 100 wt. % of syndiotactic 1,2-polybutadiene, and
wherein the content of pentaerythritoltetrakis(β-laurylthiopropionate) is 0.01-2.0 wt. % based on 100 wt. % of syndiotactic 1,2-polybutadiene.

8. The polymer composition according to claim 7,
wherein the content of 2-ethylhexyl acid phosphate is 0.03-1.6 wt. % based on 100 wt. % of syndiotactic 1,2-polybutadiene,
wherein the content of pentaerythritoltetrakis[3-(3,5-di-tert-butyl-4-hydroxyphenyl)propionate] is 0.03-1.6 wt. % based on 100 wt. % of syndiotactic 1,2-polybutadiene, and
wherein the content of pentaerythritoltetrakis(β-laurylthiopropionate) is 0.03-1.6 wt. % based on 100 wt. % of syndiotactic 1,2-polybutadiene.

9. A polymer composition comprising:
syndiotactic 1,2-polybutadiene;
2-ethylhexyl acid phosphate;
n-octadecyl-3-(3,5-di-tert-butyl-4-hydroxyphenyl)propionate; and
distearyl-3,3'-thiodipropionate,
wherein the content of 2-ethylhexyl acid phosphate is 0.01-2.0 wt. % based on 100 wt. % of syndiotactic 1,2-polybutadiene,
wherein the content of n-octadecyl-3-(3,5-di-tert-butyl-4-hydroxyphenyl)propionate is 0.01-2.0 wt. % based on 100 wt. % of syndiotactic 1,2-polybutadiene, and
wherein the content of distearyl-3,3'-thiodipropionate is 0.01-2.0 wt. % based on 100 wt. % of syndiotactic 1,2-polybutadiene.

10. The polymer composition according to claim 9,
wherein the content of 2-ethylhexyl acid phosphate is 0.03-1.6 wt. % based on 100 wt. % of syndiotactic 1,2-polybutadiene,
wherein the content of n-octadecyl-3-(3,5-di-tert-butyl-4-hydroxyphenyl)propionate is 0.03-1.6 wt. % based on 100 wt. % of syndiotactic 1,2-polybutadiene, and
wherein the content of distearyl-3,3'-thiodipropionate is 0.03-1.6 wt. % based on 100 wt. % of syndiotactic 1,2-polybutadiene.

11. A polymer composition comprising:
syndiotactic 1,2-polybutadiene;
2-ethylhexyl acid phosphate;
n-octadecyl-3-(3,5-di-tert-butyl-4-hydroxyphenyl)propionate;
4,6-bis(octylthiomethyl)-o-cresol; and
dilauryl-3,3'-thiodipropionate,
wherein the content of 2-ethylhexyl acid phosphate is 0.01-2.0 wt. % based on 100 wt. % of syndiotactic 1,2-polybutadiene,
wherein the combined content of n-octadecyl-3-(3,5-di-tert-butyl-4-hydroxyphenyl)propionate and 4,6-bis(octylthiomethyl)-o-cresol is 0.01-2.0 wt. % based on 100 wt. % of syndiotactic 1,2-polybutadiene, and
wherein the content of dilauryl-3,3'-thiodipropionate is 0.01-2.0 wt. % based on 100 wt. % of syndiotactic 1,2-polybutadiene.

12. The polymer composition according to claim 11,
wherein the content of 2-ethylhexyl acid phosphate is 0.03-1.6 wt. % based on 100 wt. % of syndiotactic 1,2-polybutadiene,
wherein the combined content of n-octadecyl-3-(3,5-di-tert-butyl-4-hydroxyphenyl)propionate and 4,6-bis(octylthiomethyl)-o-cresol is 0.03-1.6 wt. % based on 100 wt. % of syndiotactic 1,2-polybutadiene, and
wherein the content of dilauryl-3,3'-thiodipropionate is 0.03-1.6 wt. % based on 100 wt. % of syndiotactic 1,2-polybutadiene.

* * * * *